(12) United States Patent
Gunther et al.

(10) Patent No.: US 9,364,912 B2
(45) Date of Patent: Jun. 14, 2016

(54) METHOD AND DEVICE FOR THE ELECTROCHEMICAL MACHINING OF WORK PIECES

(75) Inventors: Oliver Gunther, Berkheim (DE); Thomas Hog, Mark Rettenbach (DE); Hans-Joachim Konietzni, Memmingen (DE)

(73) Assignee: stoba Sondemaschinen GmbH, Memmingen (DE)

( * ) Notice: Subject to any disclaimer, the term of this patent is extended or adjusted under 35 U.S.C. 154(b) by 81 days.

(21) Appl. No.: 14/005,823

(22) PCT Filed: Mar. 12, 2012

(86) PCT No.: PCT/EP2012/054288
§ 371 (c)(1),
(2), (4) Date: Sep. 17, 2013

(87) PCT Pub. No.: WO2012/123421
PCT Pub. Date: Sep. 20, 2012

(65) Prior Publication Data
US 2014/0008241 A1    Jan. 9, 2014

(30) Foreign Application Priority Data
Mar. 17, 2011    (DE) .......................... 10 2011 014 364

(51) Int. Cl.
| | | |
|---|---|---|
| *B23H 9/14* | (2006.01) | |
| *B23H 9/10* | (2006.01) | |
| *B23H 3/04* | (2006.01) | |
| *B23H 3/00* | (2006.01) | |
| *B23H 7/28* | (2006.01) | |
| *B23H 9/16* | (2006.01) | |

(52) U.S. Cl.
CPC .. *B23H 3/00* (2013.01); *B23H 7/28* (2013.01); *B23H 9/10* (2013.01); *B23H 9/14* (2013.01); *B23H 9/16* (2013.01); *B23H 3/04* (2013.01); *B23H 2400/10* (2013.01)

(58) Field of Classification Search
CPC ................ B23H 9/10; B23H 9/14; C25F 3/16
See application file for complete search history.

(56) References Cited

U.S. PATENT DOCUMENTS

| | | | |
|---|---|---|---|
| 4,374,313 A | 2/1983 | Mateja et al. | |
| 6,544,403 B2 * | 4/2003 | Usui | 205/666 |
| 2002/0020630 A1 * | 2/2002 | Mori et al. | 205/652 |
| 2003/0221959 A1 * | 12/2003 | Cochran | 204/280 |
| 2004/0124078 A1 | 7/2004 | Wei et al. | |
| 2005/0247569 A1 * | 11/2005 | Lamphere | B23H 1/022 205/663 |
| 2006/0231530 A1 * | 10/2006 | Beaumont | B23H 9/14 219/69.15 |
| 2007/0051619 A1 * | 3/2007 | Mazur et al. | 204/250 |
| 2009/0001053 A1 * | 1/2009 | Luo | B23H 1/04 219/69.15 |

FOREIGN PATENT DOCUMENTS

| | | |
|---|---|---|
| CN | 101862871 A | 10/2010 |
| DE | 1615168 | 5/1970 |
| DE | 97368 | 5/1973 |
| DE | 135974 | 6/1979 |
| DE | 3126099 A1 | 7/1982 |
| DE | 10042612 A1 | 4/2001 |
| DE | 10138312 A1 | 3/2003 |
| DE | 10312986 A1 | 4/2004 |
| DE | 102004054587 B3 | 5/2006 |
| EP | 1535686 A2 | 10/2004 |
| EP | 1535686 A2 * | 6/2005 |
| EP | 1629922 A1 | 3/2006 |

\* cited by examiner

*Primary Examiner* — Nicholas A Smith
(74) *Attorney, Agent, or Firm* — Loginov & Associates, PLLC; William A. Loginov

(57) ABSTRACT

The invention refers to a method for the electrochemical machining of work pieces, such as, for example, nozzles, in particular nozzles with a blind hole. The invention also refers to a device for the electrochemical machining of work pieces. The invention is characterized by a relative movement, in particular a rotary movement during the machining between work piece and cathode. The device is characterized in that cathode and/or work piece are supported rotatably on bearings for a relative movement.

15 Claims, 4 Drawing Sheets

Figure 1D:
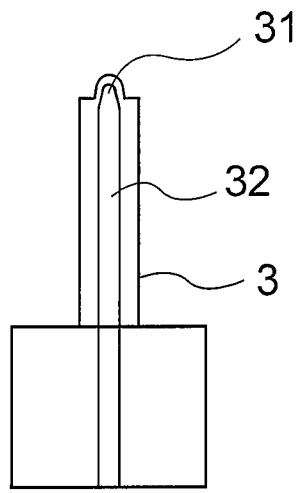

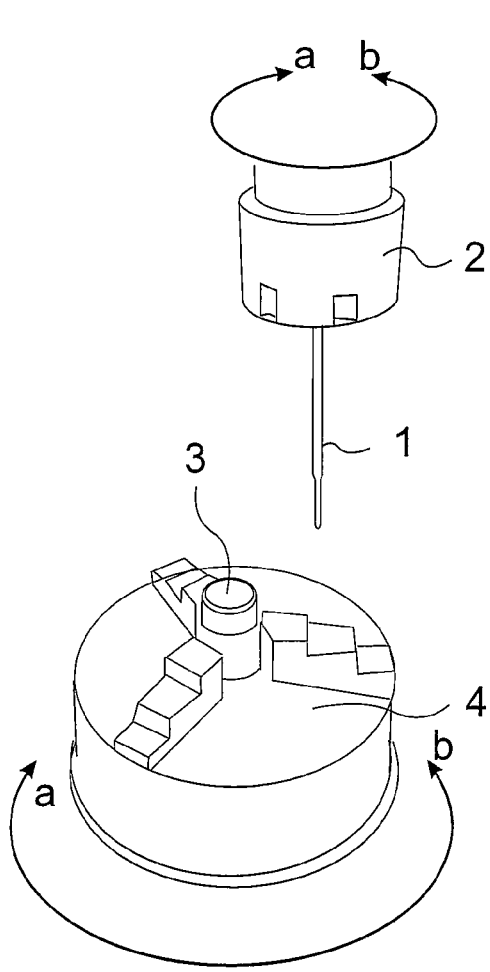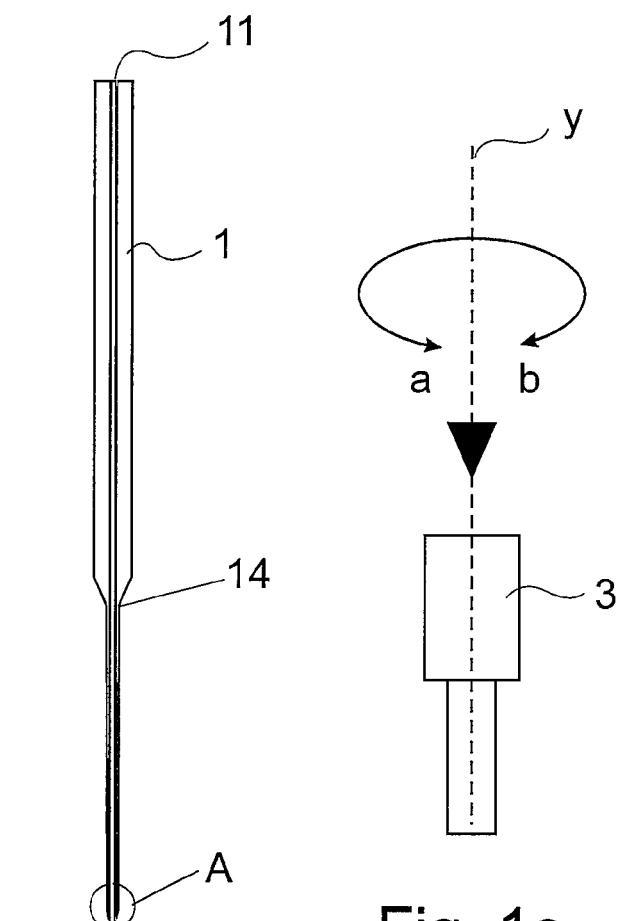
Fig. 1a  Fig. 1b  Fig. 1c

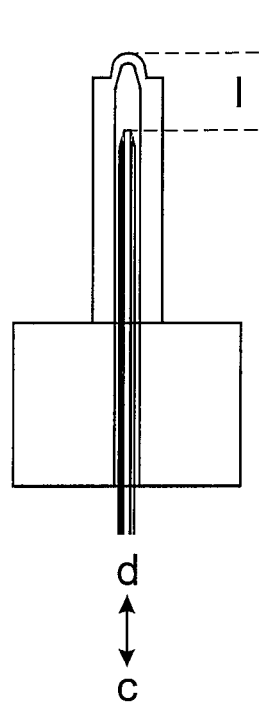
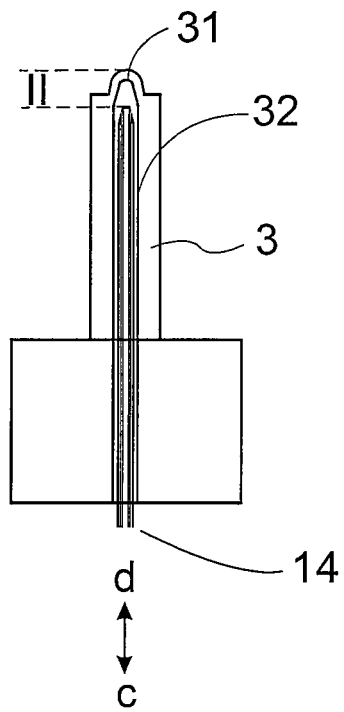
Fig. 4a
Fig. 4b
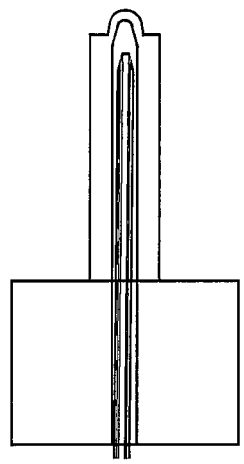
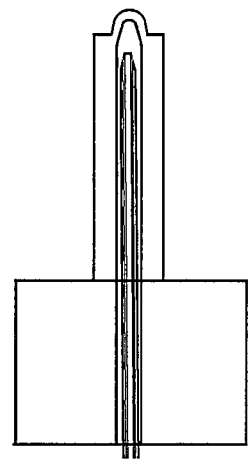
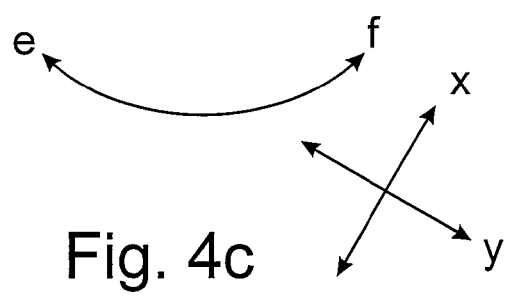
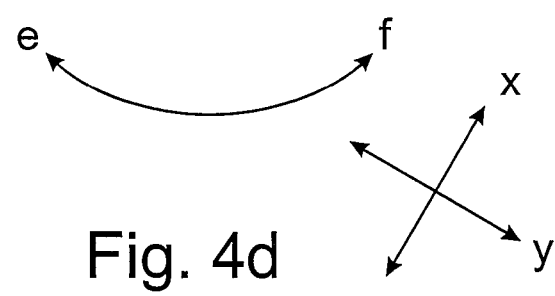
Fig. 4c
Fig. 4d

METHOD AND DEVICE FOR THE ELECTROCHEMICAL MACHINING OF WORK PIECES

The invention refers to a method and a device for the electrochemical machining of work pieces, such as, for example, nozzles. The work pieces can be machined in untempered or hardened condition without or with already formed injection holes.

The discussed nozzles are required frequently in combustion engines, in particular in the production of Diesel engines. Nozzles of this kind are characterized in that they have a bore hole in a basic body. This bore hole, for example, is realized as a blind bore hole. Blind hole nozzles for Diesel engines are offered in different embodiments. Thus, for example, a conical or cylindrical blind hole is possible. Furthermore, there is a difference between a seat hole and a blind hole. Blind hole nozzles do not have the actual openings for the discharge of the fuel in the combustion space immediately in the center or the bottom of the blind hole, but rather at the upper edge of the blind hole. Often they are provided there annularly at the diameter. However, at least one outlet nozzle is provided as a bore hole. Furthermore, it is also possible to employ blind hole nozzles such that they are used, as it were, as pressure storage in which the actual fuel discharge is controlled accordingly, however the outlet nozzle is not located in the blind hole but in a separate nozzle. As it were, the blind hole is used for example as pressure storage. Blind holes of the referred kind have a diameter of about 0.5 to maximum 1.0 mm, as a rule however 0.8 mm.

The machining of the actual bore hole, as a rule, is not difficult as it can be machined with adequate machining processes sufficiently precisely. Also grinding and, in particular, subsequently tempering with the machining processes known can be performed without any problems. What causes problems on a regular basis are the nozzles provided with a blind bore hole the nozzle pocket of which is at the bottom of the blind hole. This cannot be machined with conventional machining processes such that they show a sufficient accuracy of the surface and/or tempering. It is also a problem of the mechanic machining that the surface meanwhile finished for the blind hole should not be damaged anymore when the blind hole is machined. Neither is there a satisfying mechanic way of machining for removing inaccuracies of the surface, such as tears or rippings, smaller elevations or depressions in the material or for smoothing the material. Results achieved with a machining method, namely "coining", have also proved insufficient. The roughness of the blind hole or nozzle pocket has been reduced only slightly despite the rather high effort. The electrochemical machining of this nozzles or blind holes of nozzles in the nozzle pocket have not been successful so far either as the surfaces could not be machined with the known cathodes. The cathode conducting the flow of electrolyte directly to the surface to be machined has the result that a corresponding reduction occurs at this spot; a complete machining of the nozzle pocket with electrochemical methods, however, has not been possible so far. Because of the different configuration of the nozzle pockets a manufacturing each time adapted to the surface to be machined has been required, and therefore has been very expensive.

A method for manufacturing reproducible micro bore holes as well as a device therefore is known from the citation DE 10 2004 054 587 B1. Here a reproducible micro bore hole with certain hydraulic properties is produced by means of electrochemical processes in one piece in a work piece in which already a pre-bore hole is present. This pre-bore hole has a smaller diameter than the subsequent micro bore hole. Besides, this is here not about a blind hole or a blind bore hole but a through-hole. The cathode is here angled at the prefabricated blind hole, and moves, when impinged by an electrolyte and electric power with a defined speed through the electrode. A rotary movement of the cathode has not been disclosed in this specification.

The citation DE 103 12 986 describes a method and a device for the electro erosion machining of holes. Here an already pre-drilled hole is machined by electro erosion. Accordingly, here also a prefabricated bore hole with a smaller diameter that has been produced by mechanic machining is machined to a final dimension by electro erosion. The electro erosion method is characterized in that the material removal is achieved by means of a row of non-stationary electric discharges that are separated from each other timewise, that means that only one spark is generated at a time. The discharges are generated here by voltage sources of more than 200 Volts, and always take place in a dielectric machining medium. In contrast to the electrochemical machining, where an electrolyte is employed as liquid, in the electro erosion machining a dielectricum, that is a non-conductive liquid, is provided. Another disadvantage of the electro erosive treatment is the fact that the tools also erode gradually, that is they are reduced. This is not the case, for example, with the electrochemical machining. Furthermore, the bore hole is supposed to be conical, seen from the top to the bottom. The machining of blind holes or the pocket of a blind hole is not disclosed either in this specification. Machining of blind holes cannot be performed with a solution of this kind.

A device for the electrochemical removal of metal is known from the citation DD 135 974. However, this solution serves for the electrochemical removal of metal for machining work pieces configured rotational symmetric. The tool electrode is configured here as a pot, and pot and work piece rotate. The electrolyte solution is added without pressure so that on at least one side of the tool to be machined a smaller gap forms where the material can be removed.

Furthermore, from the DD 97 368 of 1972 a device is known for the electrochemical metal machining, in particular for slotting and separating, with adding the electrolyte under pressure, and external drive of the cathode. What it describes is that the cathode has a channel inside receiving the fluid. Furthermore, radially running distribution bore holes are described.

In the US 2004/0 124 078 A1 an electrochemical machining of airplane turbine wheels is described. Here also the tool, namely the cathode, is set in a rotary movement. The electrochemical liquid, however, is sprayed on the cathode from outside, so that obviously the machining is performed on the surface of the turbine wings. A machining of blind holes and blind hole nozzles, respectively, cannot be found in this device, either.

Relating to this state of the art, it is a problem of the invention to provide a method and a device that realize an electrochemical machining of work pieces, in particular of nozzles with a blind holes as well as a highly accurate removal more economic than in the state of the art and with high precision.

The invention relates to the before described state of the art, and suggests a method for the electrochemical machining of work pieces, such as, for example, nozzles, in particular with a blind hole that is characterized by a relative movement as a rotation carried out relatively to each other during the machining between work piece and cathode. According to the invention, a cathode that is supported on bearings, for example in a holding device, is introduced in a work piece held in a clamping device. The cathode has at least one channel inside through which the electrolyte liquid can be guided up to the pocket of the bore hole. The rotation makes it possible that the pocket of the blind hole by impinging by electrolyte, while at the same time the cathode and the work piece are rotated, preferably in opposite direction, can be done rotational directed. It is sufficient here to perform, within a rather short period of time, an electrochemical machining of the nozzle pocket without damaging the already tempered surfaces of the nozzle, in particular the blind hole. Furthermore, the desired results of removal and in particular of smoothing the nozzle pocket are achieved, so that later on, when the nozzle is employed according as intended, a higher pressure resistance with improved flow rate is achieved. Accordingly, smoothing the surface can also reduce the fuel consumption of combustion engines further. The result of the method as well as of the device for electrochemical machining of work pieces is that now an option for machining the blind hole and its pocket, respectively, has finally been created by means of which with rather low effort compared to the state of the art the inaccuracies occurring during the mechanic machining can be removed completely by the electrochemical "finishing". An expensive manufacturing of suitable cathodes, each time customized to the case of application is not necessary anymore, and inaccurate mechanic machining processes are not required anymore. The reject rate in the production of these nozzles is reduced almost to zero.

The electrochemical machining, as described before, achieves a material removal of about 40 μm. As the pocket of the blind hole nozzle has a maximum diameter of 0.8 mm, there is, of course, the problem of getting the electrolyte liquid to the nozzle pocket. This is solved by the invention, where the cathode has at least one channel pressing the electrolyte liquid into the nozzle pocket. A system pressure of roughly 5 to 10 bars is provided for that. The electrolyte liquid gets into the nozzle pocket by impinging what is necessary to make an electrochemical machining possible in the first place. Rotating the work piece and cathode will spread the electrolyte liquid evenly in the nozzle pocket so that the surface is at least moistened everywhere. It is easy to understand that, because of the dimensions, there is not much space for removing the used electrolyte, and in particular it has also be made sure that the electrolyte liquid actually gets into the nozzle pocket. This is effected by providing the cathode with an interior channel that is able to spread the electrolyte liquid evenly across the entire surface of the nozzle pocket. It is preferred here, of course, that the outlet for the electrolyte liquid in the cathode is somewhat bent outwards towards the edge of the nozzle pocket so that it does not get exactly centrally to the nozzle pocket but laterally where the actual concerned areas of removal are located. Setting cathode and work piece in a rotary movement, in particular in opposite direction, removes also another problem, namely the problem of accuracy. Even if centered very precisely, that is the cathode approaches the nozzle pocket exactly and is precisely measured, a slightly eccentric nozzle pocket may occur, as the cathode just cannot be positioned exactly centered. If now the work piece and the cathode are rotated synchronously, in particular in opposite direction or in the same direction with different speed, both rotations are superimposed, and inaccuracies, that may exist, are balanced so that an exactly circular nozzle pocket hole results.

For the start of the electrochemical machining it is, for example, sufficient when a drop of electrolyte gets in the blind hole. This can be done, of course, such that during introducing the cathode the electrolyte flow is briefly set in motion, if necessary, in order to center then the cathode. When the cathode is centered, cathode and work piece can be electrified and, of course, the electrolyte flow can also be pressurized, while at the same time the rotation of cathode and work piece starts. This makes an accurate machining possible. However, the invention is not restricted to this method. It is rather possible by means of the invention to impinge the electrolyte flow only when the cathode is centered exactly.

The new method achieves another advantage: a transition area located for example between the blind hole and the actual nozzle outlet bore hole can be machined very accurately. So far in the state of the art, certain bow-like elevations still existed at the exit of the blind hole in the direction of the nozzle outlet bore hole. By means of the new method it is now possible to smooth even these areas such that here also a considerably better course of the low is achieved when the nozzle is used according to its purpose.

It is also an advantage when in particular for this, but also for a possible finishing of the nozzle pocket itself, the electrochemical machining is supplemented by electrochemical reduction. Of course, preferably then a linear motion can be superimposed the rotary motion so that, when electric current and electrolyte are impinged synchronously, here an electrochemical machining can be performed along with electrochemical reduction.

In the state of the art, as it has been described in the beginning, for example in DE 10 2004 054 587, a solution is shown where a relative movement between tool and work piece is provided. However, in this solution, for example a Laser bore hole is formed in the work piece before the electrochemical machining, and "widened" to the desired measure by the electrochemical machining. Exactly this is not what the solution according to the invention intends, as here as a rule the prefabricated bore hole manufactured either mechanically or by laser machining or otherwise is already completely sufficiently smoothed and in particular tempered. The tempering is supposed to be maintained so that it has not to be finished once more. Furthermore, it is definitely not possible by means of this solution to remove roughness and inaccuracies in the pocket area by an electrochemical machining. In the solution according to DE 10 2004 054 587 the electrolyte liquid can escape through the prefabricated through-hole without the necessity or possibility of a machining in a "pocket area". Furthermore, draining the electrolyte liquid in the direction of the cathode is not provided at all. An aimed electrochemical machining in particular in the critical areas is not possible. Neither can a rotation in the same or opposite direction of cathode and tool be found in this specification, so that the solution according to the invention only now presents options for machining blind bore holes or blind hole nozzles in the desired dimensions. A material removal of about 40 to 50 μm is reached. This is a rather small dimension when compared with the solution presented in DE 10 2004 054 587 what requires a highly accurate machining.

DE 103 12 986 does not contain a hint of electrochemical machining a blind hole either. Here rather an electro erosion method is provided, and also a prefabricated bore hole as through hole that is supposed to be configured conically from the top to the bottom. For that the machining tool is deformed elastically within the electrode guide. If this is performed in this way, for example, in a blind hole nozzle this would cause automatically a short-circuit. The bottom of the blind hole, this is the actual pocket, could not be machined at all with a solution according to DE 103 12 986 as here an electrochemical machining is performed. The other known citations of the state of the art all describe a solution by means of which, for example, a machining of a blind hole in a blind hole nozzle is not possible. Accordingly, only the invention provides a solution that realizes the very exact machining of a blind hole, in particular in the pocket area, that is in the actual area where the nozzle bore holes are arranged and where the flow conditions of the fuel can be influenced actively. The process can be repeated here any number of times, that is at any number of nozzle pockets without damaging or wearing the tool.

According to a development of the invention, the method is characterized in that the work piece is clamped by means of a clamping device in a device for the electrochemical machining and is poled as anode. The cathode is here roughly adapted for the machining to the contour of the work piece or the blind hole to be machined. Subsequently, the cathode is centered in the blind hole, and electrolyte liquid is guided to the cathode tip in an at least one flow channel provided in the cathode. Advantageously, the electrolyte liquid is channeled out on the side in the direction to the surface to be machined, and the work piece and/or the cathode is set in a rotary movement while at the same time it is impinged by electrolyte liquid and current. This makes it possible to spread the electrolyte flow evenly over the entire surface of the nozzle pocket, and to get an in particular uniform removal. Besides, the rotation can balance inaccuracies of the blind hole itself through the electrochemical machining, and remove and/or machine the entire surface seen from the top as a circle evenly. After that the surface of the pocket of the blind hole is smoothed very evenly.

According to the invention, the cathode is adapted to the contour of the blind hole and configured roughly pin-shaped, and has a tip. At the tip of the cathode, tapering for example conically, the electrolyte liquid is guided at the side and with reference to the symmetric axis of the tip of the cathode bent to the surface to be machined. This also serves in particular for forming an idealized circle of the nozzle pocket, seen from the top after machining. This leads in particular also to the fact that—in contrast to conventional methods—not only the tip or the center of the nozzle pocket is machined, but also the lateral sides. Additionally, inaccuracies of the mechanic machining are now reduced by this electrochemical method. Accordingly, in a development of the invention the electrolyte liquid is guided in such a way to the pocket of the blind hole that the entire pocket bottom surface is machined.

Preferably, the cathode and/or the work piece are rotated during the machining process with a rate of 20 to 40 rotations per minute. It is not decisive here whether the rotation of cathode and tool are in the same or in opposite direction. However, an opposite direction of the rotation of cathode and tool is preferred, or rotations in the same direction with rather different speed.

In a modification of the method according to the invention, a machining period of 2 s to 30 s, preferably 5 s is provided. The surface to be machined is impinged during the machining process in the device, for example, with 30 to 180 ampereseconds. The process current is applied on the work piece as direct current, pulsating direct current with high peak current density. The ratio pulse/break is chosen such that a satisfying removal of heat occurs in the gap. Depending on the amount that is supposed to be removed from the surface by electrochemical machining, the current and/or the flow of electrolyte or pressure can vary. Furthermore, it is, of course, also possible to vary the period of machining.

As an electrolyte liquid preferably sodium nitrate with a concentration of 5 to 30 percent is employed, preferably 20 percent is employed. As process pressure for the electrolyte liquid a pressure of 5 to 10 bar is provided. This use of electrolyte liquid, however, may not be seen in no way restricting. Even other suited electrolyte liquids can be employed in the method according to the invention.

The removed material (hydroxide) is channeled out through the electrolyte flow and gets in a recycling plant where it is cleaned and, if necessary, recycled to be used one more time.

In an alternative modification of the method according to the invention it is provided that the surface to be machined is machined alternatively or additionally by electrochemical reducing and/or electrochemical grinding or polishing. This also serves for increasing further the accuracy and quality of the surface.

In order to be able to evaluate the result of the electrochemical machining, the invention suggests in a development that an optical inspection, preferably by optical scanning, is performed in order to carry out a new machining with, if necessary, adapted parameters if the removal at the surface to be machined has not been sufficient. For example, here an optical system in the form of a camera or in the form of an optical sensor is directed to the surface to be machined, wherein the surface is either captured and recorded completely, or a scanning is performed, that means the machining of the surface is inspected section by section. The result of the optical scanning can lead to the conclusion whether a machining is required one more time, and whether the adjustment angle of the nozzle, if necessary, or the period of machining, the electrolyte pressure and flow, respectively, or the current of the pulse/break ratio or the pulse intensity have to be changed.

Another advantageous development suggests that for a non-destructive inspection of the nozzle pocket a test specimen is manufactured from the interior of the blind hole before machining.

After machining, another test specimen is manufactured from the interior of the blind hole, and both test specimens are compared to each other to evaluate the result of the machining. This is an excellent way of proceeding for being able to evaluate the result of the machining. The comparison can here be performed with inspection devices provided for such purposes. It is also possible to document these test specimens graphically, and to perform, for example, a graphic comparison by overlapping or superimposing of the surfaces.

Preferably, a quick molding material is used for manufacturing of the test specimen(s). This is known, for example, from the dental technology for manufacturing dental imprints. Aginal is an example that is used here. This quick molding compound has the advantage that a quick assembling and, in particular, also a quick hardening of the compound is performed, so that very accurate imprints can be formed. The material has very low shrinking properties. Removing this quick molding material after hardening does not cause any problems either as it does not create any close connections with the interior surface of the blind hole and the machined surface.

The invention, of course, suggests in a development to perform an inspection of the machining process by means of magnetic field measuring technology or ultra sound technology before and after machining in order to evaluate the result of the machining. Of course, here also a suitable graphic analysis by superimposing the results of the inspection before and after machining is provided.

The method according to the invention is also characterized according to a modification in that for centering the cathode the cathode itself is positioned close to the blind hole of the nozzle by approximation. First, the approximation is carried out linear to position the tip of the cathode rather close to the blind hole. For a centering with reference to the blind hole, the cathode is then slightly swiveled laterally with reference to the symmetric axis of the blind hole, and thus approached to the ideal diameter of the blind hole. When the cathode is thus positioned perfectly centrally for the machining, the machining can be performed. When the cathode is set in a rotary movement during machining and/or a synchronous rotary movement of the work piece, in particular perfect results are achieved for the surface machining, and/or an improvement of centering the nozzle pocket relatively to the central axis of the bore hole.

The invention also suggests a device for the electrochemical machining of work pieces, such as, for example, nozzles, preferably with a blind hole. The suggested device serves in particular for performing the method as described before in very different embodiments and modifications. The device is characterized in that a cathode rotatably supported on bearings in a holding device and a clamping device rotatably supported on bearings for the work piece are provided. Apart from that, the device for the electrochemical machining is equipped and configured as it is usual for the electrochemical machining. Thus, of course, a feed for the electrolyte liquid is provided as well as a drain. Furthermore, there are suitable storage containers, and pressure generators for electrolyte liquid, as well as also a power supply to provide suitable current during machining. Of course, also the suitable positioning motors and devices, respectively, are provided. This may be, for example, a linear motor. However, it may also be a hydraulic device positioning for example the cathode. Also the clamping device for the work piece is configured as usual. However, according to the invention, the cathode in or with the holding device as well as the clamping device or the work piece in the clamping device are supported rotatably supported on bearings. A suitable drive for generating the rotation is, of course, also comprised by the invention. A common drive can be provided here as well as separate drives.

The big advantage when either cathode or clamping device or both are supported rotatably has already been described in detail in the description of the method. This rotatable configuration makes a perfect machining in particular of a blind hole and here in particular of the pocket of a nozzle possible. The rotatable support of cathode and clamping device realize the relative movement mentioned at the beginning.

It is also an advantage when cathode and/or clamping device can move linear towards each other or away from each other. Thus the cathode can be positioned perfectly, for example, in the nozzle pocket. This mobility is also important for positioning the cathode itself, that is the approximation before the machining process. As already described before, first the cathode is here introduced in the blind hole and moved linearly in the direction of the nozzle pocket. Shortly before it is stopped, and, if necessary, it is measured again or tested to proceed then in another position. In the meantime, the cathode and/or the clamping device is/are shifted or swiveled slightly deviating from the symmetric axis of the cathode or the pocket drillers, so that it is in contact with the inside of the blind hole. Then it is swiveled and shifted, respectively, to the other side. By centering of the values scanned in X- and Y-direction, the cathode can be positioned perfectly. The method also works with a cathode that can shift or swivel with reference to the symmetric axis, as well as with a clamping device that can shift and swivel, respectively, accordingly. The linear movement is required in particular for positioning the cathode in the work piece.

The invention is characterized in that according to a development in the interior of the cathode at least one flow channel is provided for the electrolyte liquid with at least one outlet at or near the tip of the cathode at or on the side facing the work piece to be machined. The outlet is provided here facing outwards with reference to the symmetric axis of the cathode, and bent with reference to the vertical line. What this effects is that not only the center of the blind hole or of the nozzle pocket is machined, but also the further outside positioned surface areas of the nozzle pocket. An oblique outlet, that is an outlet differing from the symmetric axis for the electrolyte liquid, achieves an altogether more homogenous and more even machining. An in particular preferred embodiment provides that in the cathode two flow channels each with its own outlet for the electrolyte liquid are provided. It is still convenient when at each outlet for the electrolyte liquid at or near the tip guide grooves or guide flutes are provided guiding and/or spreading the electrolyte flow in the desired direction on the work piece surface to be machined. This also serves altogether for a more even machining, that is a more uniform reduction of material in the nozzle pocket. Preferably, the diameter of the cathode is smaller than the diameter of the blind bore hole. As the cathode during the electrochemical machining is, as it were, imaged in the material, it is preferred that the cathode on its side facing the blind hole is not configured pointedly but roundly. The rounding is only configured here in the front, actually pointed area of the cathode. Furthermore, it is possible, of course, that the swiveling area or the radius of the movement of the cathode is chosen larger than the existing radius. This is about, for example, widening the blind hole with respect to the bore hole. The blind hole can also be configured as hemisphere. In this case, the cathode has to be lowered rotating into the pocket. When the ratio of lowering rate and removal rate are balanced, a machining gap will occur sufficient for the outlet of the electrolyte.

Here, also a solution is favored where the diameter of the cathode is always smaller than the diameter of the blind hole. This is also an advantage as thus at the same time a sufficient discharge of electrolyte can be guaranteed what is not possible anymore when the configuration matches.

It is another advantage when the cathode according to a development can shift or swivel in the device with reference to the machining axis or symmetric axis of the blind hole in the work piece. The advantages of this embodiment have already been described before as they are very important in performing the positioning of the cathode before machining. The same result can be reached when the clamping device can shift or swivel with reference to the machining axis or the symmetric axis. Of course, the invention comprises also a solution where the cathode in the device as well as the clamping device in the device can shift or swivel with reference to the machining axis.

According to the invention the cathode is configured essentially pin-shaped. Similar to large capacity refills for ballpoint pens, the cathode has a tapering on the side facing the work piece to be machined, the outer diameter of which, in particular, is clearly smaller, in particular roughly half the interior diameter of the blind hole to be machined. Compared with that, the diameter of the cathode has in its top part, that is on the side opposite the work piece, roughly the same exterior diameter as the interior diameter of the blind hole.

According to the invention, the cathode is formed of an electrically conducting, corrosion-resistant material. There are no other restrictions concerning the material. All corrosion-resistant and/or electrically conducting materials are suited here in a particular way. Of course, corrosion-resistant steel is preferred here.

Of course, the device according to the invention also comprises inlets and outlets, respectively, for the electrolyte liquid, electric connections for the cathode and the anode, as well as a power supply. Accordingly, the device according to the invention is constructed roughly like usual devices for the electrochemical machining, namely with the suitable additional aggregates as described in the beginning.

It has to be pointed out in this connection that in particular all characteristics and properties described in connection with the device, but also methods can be transferred accordingly also with reference to the formulating of the method according to the invention, and can be employed according to the invention, and are seen also as disclosed. The same also goes vice versa, that means constructive characteristics only mentioned with reference to the method can also be considered and claimed in the frame of the device claims, and thus are also part of the invention and disclosure.

Figure 1E:
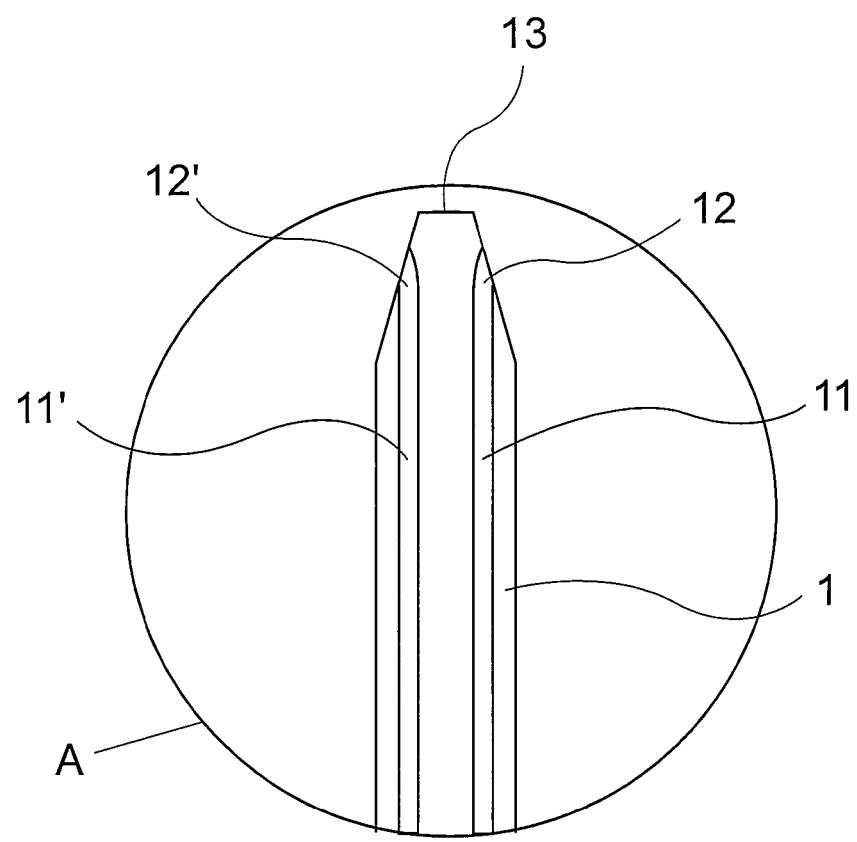
Figures 2A, 2B:
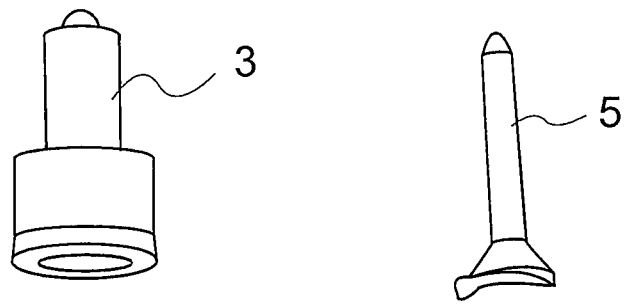
Figure 3:
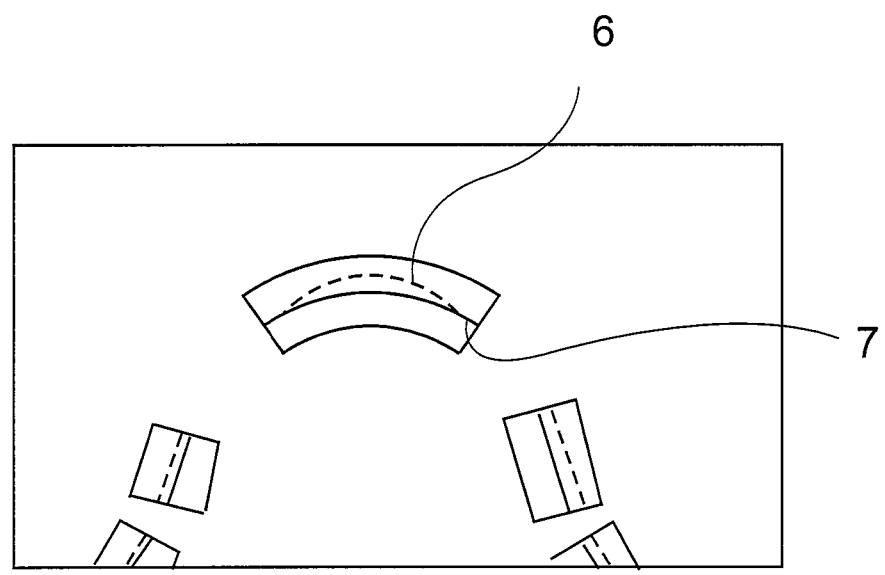

In the drawing the invention is shown schematically in an embodiment. In the figures:

FIGS. 1a to 1e main parts and details of the device according to the invention for performing the method according to the invention, FIGS. 2a and 2b work piece and test specimen according to the invention, FIG. 3 schematic view of an evaluation graphic according to the invention, and FIGS. 4a to 4d course of the method during positioning and/or centering the cathode for performing the method according to the invention.

In the figures identical or corresponding elements each time are referred to by the same reference numbers, and therefore are, if not useful, not described anew.

FIGS. 1a to 1e show main parts and details of the device according to the invention for performing the method according to the invention. In FIG. 1a a cathode 1 is shown provided in a holding device 2. According to the invention, either the cathode 1 is supported rotatably on bearings in the holding device 2 or, as it can be seen in the schematic view, also the holding device 2 can rotate in the direction of the circular double arrow a, b. It is intended here that the holding device and the cathode, respectively, can rotate in direction a as well as in direction b. The cathode is shown here before the positioning. In the bottom part of FIG. 1a, a clamping device 4 is shown in which the work piece 3 is clamped centrically. In the shown embodiment, for example a three-jaw chuck is used. It is here conveniently provided that either the holding device 2 can rotate in the direction of the double arrow a, b, or a not shown embodiment where the work piece is supported rotating on bearings in the holding device itself. This can be done, for example, after the clamping operation. FIG. 1b shows a cathode 1 according to the invention. In the cathode 1, a flow channel 11 is provided for transporting electrolyte liquid to the tip 13 of the cathode. The cathode 1 is, as it can be seen, tapered in the bottom part, that is the part facing the work piece 3 during machining. The tapered point is indicated here by reference number 14. The circle referred to by A indicates the section shown in FIG. 1e. That means, in FIG. 1e the cathode is shown enlarged because of its very small size. This means, it concerns the part of the cathode 1 that is connected to the stronger end of the cathode 1 facing the work piece 3 in the machining position.

Accordingly, it can be seen in FIG. 1e that the cathode 1 has two flow channels 11, 11'. The outlets 12, 12' do not exit the cathode immediately at the tip 13 of the cathode 1, but at the conical tip 13 on the side. For this, the outlets 12, 12' are rounded outward laterally, so that they do not hit the surface to be machined directly straight, but slightly angled. What cannot be seen in this view is the configuration whereupon at the surface of the tip 13, starting at the outlets 12, guide grooves or guide flutes are provided. These serve for conducting the electrolyte liquid in the rather narrow spaces between work piece 3 and cathode 1 during machining. FIG. 1c schematically shows the work piece 3 wherein in this view it is indicated that the cathode 1 can rotate in the direction a, b. Furthermore it is indicated that in the direction of the arrow along the symmetric axis y the cathode, of course, has to be introduced in the work piece and must be suitably positioned and centered there. This will be described in detail further down (FIGS. 4a to 4d).

FIG. 1d shows a work piece 3 still to be machined. The work piece 3 has a blind hole 32. This blind hole 32 has a nozzle pocket 31, the machining of which is actually the topic when performing the method according to the invention. The nozzle 30 is widened conically on the side opposite the nozzle pocket 31. The same goes for the blind hole 32 that is also conically widened on its side opposite the nozzle pocket 31.

FIGS. 2a and 2b: in FIG. 2a the outer contour of the work piece 3 according to the invention is shown as three-dimensional view. In FIG. 2b a test specimen 5 is shown manufactured such that, for example, before the electrochemical machining, a quick molding compound, for example for manufacturing dental imprints in the dental technology, such as, for example Aginal, is pressed in the blind hole 32, and this is such that it is filled completely. After setting and hardening, respectively, of the quick molding compound, the test specimen can be removed from the blind hole without any problems and without larger efforts being required, and, in particular, without damaging the surface of the blind bore hole. This test specimen 5 then serves for a comparison with a second test specimen, not shown here, that will be manufactured after the electrochemical machining. Now these test specimens 5 can be superimposed photographically or otherwise, and thus evaluate the result of the machining. This means, test specimen 5 before the electrochemical machining is compared with the test specimen 5 after the electrochemical machining, in order to be able to determine the difference of removal. This can be performed, for example, in an evaluation diagram, as shown in FIG. 3. However, this diagram can be generated in another way, for example by magnetic field measuring technology or ultra sound technology. The solid line 7 shows here the area of the nozzle pocket 31 to be machined before machining. The dashed line 6 shows the nozzle pocket after machining. It can be seen clearly here that the removal is almost continuous. As a rule, line 7 is not so smoothly drawn, but rather cracked and irregular. However, this cannot be shown easily in a drawing.

FIGS. 4a to 4d show the course of the process during positioning and/or centering the cathode 1 for performing the method according to the invention. As it can be seen in FIG. 4a, the cathode 1 is introduced in direction d in the blind hole of the work piece 3. Here, it is first carefully scanned with a space I, to move it then, as shown in FIG. 4b, further in the direction of the nozzle pocket 31. If necessary, it is tested again with a distance II before it can be put into its final position for the electrochemical machining. However, before this final positioning is performed, swiveling or shifting of the cathode 1 or the work piece 3 deviating from the symmetric axis is required, and this is such that the cathode 1 touches the inside of the blind hole 32, but does not damage it. For this, either the cathode 1 or the work piece 3 can be swiveled in the direction e-f, and/or be shifted in X-/Y-direction. For the course of the machining, the nozzle bodies are delivered already essentially finished for the electrochemical machining so that only the nozzle pockets 31 have to be machined. For this reason, it is important that there is no lateral contact of the cathode at the blind hole 32. However, it is decisive for a correct positioning that the swiveling movement is performed in direction e, f with reference to the nozzle pocket 31 so that the cathode 1 can be positioned perfectly for the electrochemical machining, in order to receive finally a nozzle pocket 31 that is machined electrochemically centrally. Thus, within the nozzle a perfect flow is obtained when used as intended.

The claims filed along with the application now and later on are without prejudice for obtaining a wider protection.

If, on closer examination, in particular also of the relevant state of the art, it turns out that one or the other characteristics is convenient for the object of the invention, however, not decisively important, of course, already now a formulation is aimed at that does not contain anymore such a characteristic, in particular not in claim 1. Even such a sub-combination is covered by the disclosure of this application.

Furthermore, it has to be taken into consideration that the embodiments and modifications of the invention described in the different examples and shown in the figures can be combined with each other in any way. Here single or several characteristics can be exchanged in any way. These combinations of characteristics are also disclosed.

The references cited in the depending claims refer to the other embodiment of the subject matter of claim 1 through the characteristics of the respective sub-claim. However, they are not to be understood as a waiver for the object of obtaining an individual protection for the characteristics of the referred sub-claims.

Characteristics that only have been disclosed in the description or also single characteristics of claims comprising a multitude of characteristics, can be taken over at any time in the independent claim/s as being of inventive relevance for delimiting from the state of the art, and this is even if such characteristics have been mentioned in connection with other characteristics and reach particular advantageous results in connection with other characteristics, respectively.

The invention claimed is:

1. Method for electrochemical machining of work pieces with an electrolyte liquid of nozzles with a blind hole, comprising:
    providing a relative movement as a rotary movement during the machining between a work piece and a cathode, wherein the cathode has two flow channels in an axial direction, wherein each flow channel is provided with its own outlet, which is facing outwards with reference to a symmetric axis of the cathode and which is bent with reference to an axial direction of the cathode tip, and
    providing a rotary direction of cathode and tool in the same or opposite direction.

2. Method according to claim 1, wherein the work piece is clamped by means of a clamping device in a device and poled as anode, wherein the blind hole points to a cathode roughly adapted to the contour of the work piece or the hole to be machined, after that the cathode is centered in the blind hole, and an electrolyte liquid is conducted to the tip of the cathode in at least one flow channel provided in the cathode, where it is channeled out on the side in the direction to the surface to be machined, and the work piece and the cathode are set in a rotary motion while at the same time electrolyte liquid and current is/are applied.

3. Method according to claim 1, wherein the electrolyte liquid on the side at the tip of the in particular pin-shaped cathode and bent with reference to the symmetric axis of the cathode tip is guided to the surface to be machined, and is spread there in particular evenly, the electrolyte liquid is guided to the bottom of the blind hole, in order to machine the blind hole head surface, wherein the cathode and the work piece rotate with a speed of 20 to 40 rotations per minute.

4. Method according to claim 1, wherein a machining period of 2 to 30 seconds, preferably 5 seconds, and/or in that the surface to be machined is impinged with 30 to 180 ampere seconds.

5. Method according to claim 1, wherein as an electrolyte liquid preferably sodium nitrate in a concentration of 5 to 30 per cent, preferably 20 per cent is used, and in particular a pressure of the electrolyte liquid of 5 to 10 bars is provided, and/or the surface to be machined is machined alternatively or additionally by electrochemical machining and/or electrochemical polishing.

6. Method according to claim 1, wherein an optical inspection, preferably by optical scanning is performed in order to machine again, if necessary, with adapted parameters, if the reduction at the surface to be machined has not been satisfying.

7. Method according to claim 1, wherein a test specimen is manufactured of the interior of the blind hole before machining, and another test specimen after machining, and both test specimens are compared to each other to evaluate the result of the machining, wherein preferably for manufacturing the test specimen a quick molding compound for manufacturing dental imprints from the dental technology, such as, for example, Aginal, is used, in particular preferably a testing is performed by means of magnetic field measuring technology or ultrasound technology before and after machining in order to evaluate the result.

8. Method according to claim 1, wherein for centering the cathode is positioned by approximation close to the blind hole of the nozzle, and is approached by lateral swiveling with reference to the symmetric axis of the blind hole, so that the cathode is positioned perfectly for machining, in particular centered, wherein the cathode is impinged with electrolyte liquid either already at the beginning of the centering operation, however at the latest after the end of the centering.

9. Device for the electrochemical machining of work pieces, such as, for example, nozzles, preferably with a blind hole, in particular for performing the method according to claim 1, wherein a cathode rotatably supported on bearings in a holding device, and a clamping device rotatably supported on bearings for the work piece to be machined with at least one drive that can drive the holding device along with the cathode and the clamping device along with the work piece in a rotation in the same or opposite direction, wherein the cathode has two flow channels in an axial direction, wherein each flow channel is provided with its own outlet, which is facing outwards with reference to the symmetric axis of the cathode and which is bent with reference to the axial direction of the cathode tip.

10. Device according to claim 9, wherein the cathode and/or clamping device can be moved linear towards each other or away from each other.

11. Device according to claim 9, wherein in the interior of the cathode at least one flow channel for the electrolyte liquid with at least one outlet at the tip of the cathode or the side facing the work piece to be machined is provided.

12. Device according to claim 9, wherein at least one outlet is provided and the at least one outlet is provided pointing outwards, bent with reference to the symmetric axis (y) of the cathode.

13. Device according to claim 9, wherein at least one outlet is provided and at each of the outlets for the electrolyte liquid at the tip of the cathode-guiding grooves or flutes are provided guiding to and/or spreading on the work piece surface to be machined the flow of the electrolyte.

14. Device according to claim 9, wherein the cathode or the holding device can be swiveled in the device with reference to the machining axis or the symmetric axis (y) of the blind hole in the work piece, and/or the clamping device can swivel in the device with reference to the machining axis or the symmetric axis (y) of the blind hole in the work piece.

15. Device according to claim 9, wherein at the cathode on the side facing the work piece to be machined a tapering is provided whose exterior diameter is in particular clearly smaller than, in particular half of the interior diameter of the blind hole, wherein preferably the diameter of the cathode has in the top part, that is at the side opposite the work piece, roughly the same exterior diameter as the interior diameter of the blind hole, and/or the cathode is formed from an electrically conducting, corrosion resistant material, and inlets and outlets, respectively, for the electrolyte liquid, electrical connections for the cathode and the anode, as well as a power supply are provided.

\* \* \* \* \*